UNITED STATES PATENT OFFICE 2,687,398

COMPOSITION OF SILICON-ALKYD RESIN AND AN EPOXY RESIN

William Malcolm McLean, Midland, Mich., assignor to Dow Corning Corporation, Midland, Mich., a corporation of Michigan No Drawing. Application July 14, 1952, Serial No. 298,851

1 Claim. (Cl. 260—45.4)

This invention relates to resins comprising mixtures of silicone-alkyd and epichlorohydrin-bisphenol resins.

The use of silicone-alkyd resins for magnet wire enamel on bare copper has proved to be satisfactory. However, not all magnet wire used in the electrical industry is bare wire. Considerable use is made of wire which has been enclosed in a glass fabric jacket (commonly called "glass served" wire). Resins which are suitable on bare copper wire are not necessarily suitable for use as an impregnant for this glass serving. When previously known silicone-alkyd resins are employed to coat glass served wire, difficulty is encountered in obtaining the required hardness and proper coating characteristics. This seems to be due to the affect of the glass fabric on the resin.

It is the object of this invention to provide compositions which are suitable for use as coating resins for glass served electrical conductors and for metallic conductors in general.

This invention relates to resinous compositions comprising (1) from 10 to 30 per cent by weight of the reaction residue of epichlorohydrin and bis - p,p',hydroxyphenyldimethylmethane, said residue having an epoxy equivalent of at least 450 and (2) from 70 to 90 per cent by weight of the reaction residue of (a) from 40 to 80 per cent by weight of a silicon compound of the formula

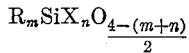

(b) from 10 to 40 per cent by weight of terephthalic or isophthalic acids or the lower alkyl esters thereof and (c) from 9 to 35 per cent by weight glycerine.

The above compositions are prepared by blending the epichlorohydrin-bis-p,p',hydroxyphenyldimethylmethane resin (hereinafter referred to as the epoxide resin) with the silicone-alkyd resin in the proportions above indicated. The blending is best carried out by mixing a solution of the two and it is often advantageous to warm the mixture to facilitate homogeneity.

The epoxide resins employed in this invention are formed by the condensation of epichlorohydrin and bis-p,p',hydroxyphenyldimethylmethane in the presence of NaOH. During the condensation HCl or NaCl is split out to form polyethers which have epoxy groups on the end of the chain. The degree of polymerization is expressed in terms of epoxy equivalents. The term "epoxy equivalent" is defined as the weight of the resin in grams containing one gram equivalent weight of epoxy groups. The resins are represented by the formula

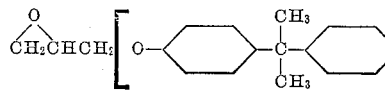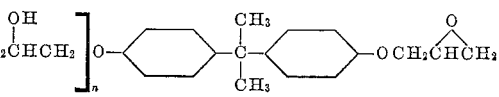

where $n$ is an integer. Thus it can be seen that the higher the epoxy equivalent, the higher will be the degree of polymerization of the resin.

Resins of the above type are available commercially. One brand of such resins is sold by the Shell Chemical Corporation under the name "Epon."

Silicone-alkyd resins employed in this invention are prepared by reacting the defined organosilicon compounds with the defined acids or esters and glycerine. In general, the reaction is carried out by heating appropriate mixtures of the materials at temperatures from 100° C. to 280° C. During the reaction the acids or their esters and glycerine condense to form a glyceride with the elimination of water or an alcohol respectively. The organosilicon compounds react with the glycerine hydroxyls to split out alcohols or water. The above reaction is best carried out in suitable solvents which include such materials are isophorone and cresylic acid.

The organosilicon compounds employed in this invention are of the formula

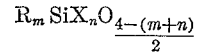

where R is an alkyl radical of less than 5 carbon atoms or a phenyl radical, X is an alkoxy radical or OH, $m$ has an average value of from 1 to 2, $n$ has an average value of from .01 to 3, and the sum of $(m+n)$ is not greater than 4. The above organosilicon compounds include both monomeric alkoxysilanes and silanols of the formula

and partial condensates thereof. These partial condensates are polymeric siloxanes having hydrocarbon groups, alkoxy groups and/or OH radicals attached to the silicon. The number of functional groups per silicon may vary from 1 functional group per 100 silicons to 3 functional groups per silicon. Both the above silanes and the partial condensates are known materials.

The hydrocarbon groups may be alkyl radicals such as methyl, ethyl, propyl, and butyl or phenyl radicals. Any alkoxy group may be present in the silanes although it is preferred that the alkoxy radicals contain less than 5 carbon atoms, since the corresponding alcohols are more easily removed from reaction mixture.

Specific silanes which may be employed in this invention are, for example, phenylmethyldiethoxysilane, phenyltrimethoxysilane, dimethyldiisopropoxysilane, diethyldibutoxysilane, monomethyltriisopropoxysilane, diphenylsilanediol, phenylmethylsilanediol and diethylsilanediol. It is to be understood that either individual silanes or mixtures of one or more silanes may be employed together with partial condensates of individual silanes or mixed silanes. These partial condensates are the preferred starting material.

The acids employed in this invention are terephthalic and isophthalic acids together with their lower alkyl esters. Thus examples of acid compounds which are operative in this invention are dimethylterephthalate, diethylterephthalate, dimethylisophthalate, monomethylisophthalate, monobutylterephthalate, terephthalic acid and isophthalic acid or mixtures of any of the above acids and esters.

The blended resins of this invention are particularly adaptable for coating compounds due to a combination of hardness, flexibility, thermal stability, solvent resistance, and good coating characteristics. These resins may be employed on metallic surfaces to give protective coatings and they are particularly beneficial for use in connection with glass served electrical conductors.

Normally, the resins are applied to the conductor by dipping it in the resin and thereafter passing the conductor through a heated tower. In general the heating is in the range of from 300° C. to 400° C. Upon emerging from the tower, the resin is cured and the conductor is ready for use.

If desired, the resins of this invention may be modified by including therein up to 10 per cent by weight of a drying oil such as linseed oil, castor oil, oiticica oil, and soyabean oil. In lieu of the oils, the acids derived therefrom may also be employed. The modifying oils or acids may be combined with either the silicone alkyd portion or the epoxide portion of the resins either prior to or after blending. In either event, the reaction between the oil and the resin is best carried out by heating at a temperature above 100° C.

The following examples are illustrative only and are not to be construed as limiting the invention which is properly set forth in the appended claims.

*Example 1*

210 parts of glycerine, 261 parts of dimethylterephthalate and 35 parts of isophorone were mixed and heated at 210° C. until the theoretical amount of methanol was removed. 935 parts of cresylic acid and 588 parts of a partially hydrolyzed silane having the composition 67 mol per cent phenylmethylsiloxane, 33 mol per cent monophenylsiloxane and containing 20 per cent by weight methoxy groups, were added and the heating continued at 210° C. until the theoretical amount of methanol was removed. All of the above parts are parts by weight.

Epoxide resins having varying epoxide equivalents were added to the above silicone-alkyd resin solution in the amounts shown below. In each case the per cent by weights are based upon the resins used. After addition of the epoxide resin the mixture was warmed to 80° C. to 90° C. to hasten solution.

Each of the solutions was used to coat "glass served" copper wire. In each case the wire was passed through the solution and then through a heating tower at the rate of 10 feet per minute. The tower was maintained at 300° C. to 400° C. The dipping and curing was repeated four times. The resulting resin coating was tested for hardness as shown below.

| Percent by wt. silicone-alkyd | Percent by wt. epoxide resin | Epoxy equivalent of epoxide resin in g. | No. of scrapes before failure |
|---|---|---|---|
| 100 | | | 26 |
| 90 | 10 | 450– 525 | 39 |
| 80 | 20 | 905– 985 | 79 |
| 80 | 20 | 1,600–1,900 | 116 |
| 90 | 10 | 2,400–3,000 | 51 |
| 80 | 20 | 2,400–3,000 | 55 |

From the above it can be seen that the optimum results are obtained with epoxide resins having an epoxy equivalent between 1600 and 1900 g. In all of the above cases the resins were flexible and heat stable.

The scrape test was carried out by pulling the coated wire across the point of a needle while the needle was under a load of 600 g. The needle point was .039 inch in diameter. The scrape is expressed as the number of times the needle, held sideways, could be passed across the wire before the needle cut through the resin coat.

*Example 2*

Equivalent results are obtained when isophthalic acid is substituted for the dimethylterephthalate of Example 1.

*Example 3*

Equivalent results are obtained when a hydroxylated siloxane containing about 1 silicon bonded OH per Si atom, and having the composition 70 mol per cent phenylmethylsiloxane and 30 mol per cent monophenylsiloxane, is employed in the procedure of Example 1.

That which is claimed is:

A resinous composition consisting essentially of: (1) from 10 to 30 per cent by weight of the condensation product of epichlorohydrin and bis-p,p',hydroxyphenyldimethylmethane, said product having an epoxy equivalent of at least 450 and (2) from 70 to 90 per cent by weight of the reaction product of (a) from 40 to 80 per cent by weight of an organosilicon compound of the formula

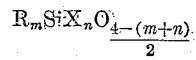

where R is selected from the group consisting of alkyl radicals of less than 5 carbon atoms and phenyl radicals, X is of the group consisting of alkoxy and OH radicals, $m$ has an average value from 1 to 2, $n$ has an average value from 0.01 to 3 and the sum of $(m+n)$ is not greater than 4, (b) from 10 to 40 per cent by weight of a compound selected from the group consisting of terephthalic and isophthalic acids and lower alkyl esters thereof and (c) from 9 to 35 per cent by weight glycerine.

References Cited in the file of this patent

UNITED STATES PATENTS

| Number | Name | Date |
|---|---|---|
| 2,587,295 | Doyle et al. | Feb. 26, 1952 |

OTHER REFERENCES

Paint Oil & Chem. Review, vol. 113, No. 23, Nov. 9, 1950, pp. 15–18, 43 and 49.

Glaser, Official Digest, No. 305, June 1950, pp. 418 and 437–442.